Dec. 27, 1927. Re. 16,838

R. M. TANGYE

CARBURETOR

Original Filed Oct. 6, 1919

INVENTOR.
ROY M. TANGYE

BY B. J. Craig,
ATTORNEY.

Reissued Dec. 27, 1927. Re. 16,838

UNITED STATES PATENT OFFICE.

ROY MORTIMER TANGYE, OF DENVER, COLORADO, ASSIGNOR, BY MESNE ASSIGNMENTS, OF ONE-FOURTH TO THE COLORADO CARBURETOR COMPANY, A CORPORATION OF COLORADO.

CARBURETOR.

Original application filed October 6, 1919, Serial No. 328,756. Renewed March 19, 1923. Original No. 1,471,220, dated October 16, 1923. Application for reissue filed December 12, 1924. Serial No. 755,579.

The present invention relates to improvements in carburetors, the object being to provide simple and effective means for securing a more complete intermingling of the liquid fuel and air to effect a more complete and thorough atomization of the former. An additional object of the invention is to provide a carburetor including a stationary member having tangential air passages in its walls to cause a swirling action of the air entering the vaporizing chamber.

A further object is to provide a device that can be incorporated as a fixed part of a carbureter or can be sold as an article of manufacture, and can be fixed stationary in a carburetor without altering the structural features thereof in either instance the device serving to rotate the air as it mixes with the fuel vapors.

One embodiment of the invention is illustrated in the accompanying drawings, wherein:—

Figure 1:
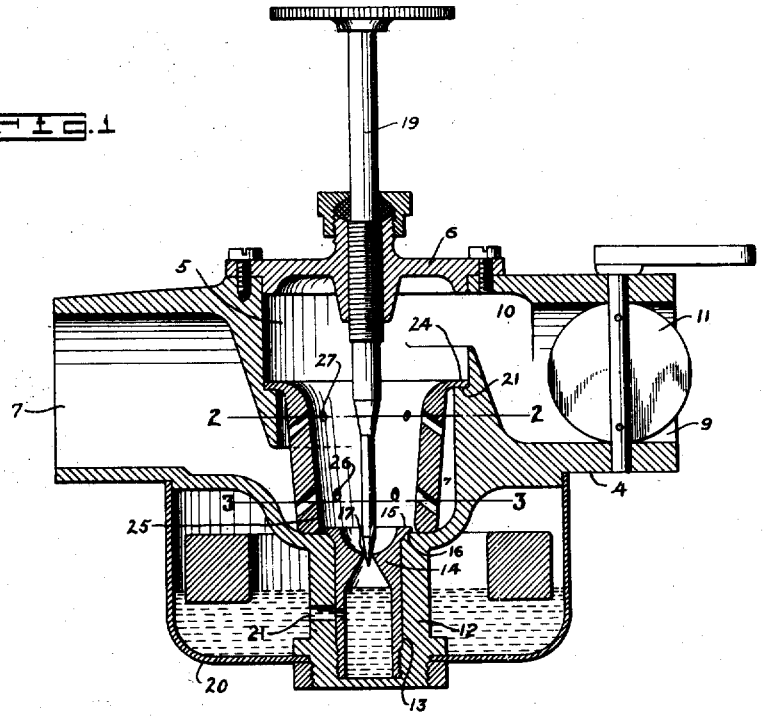

Figure 1 is a vertical sectional view through a carburetor, showing the device in place.

Figure 2:
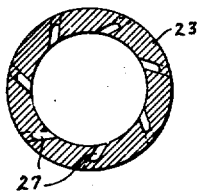
Figure 3:
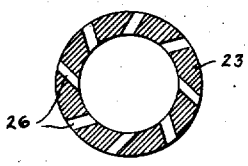

Figures 2 and 3 are cross sectional views on the lines 2—2, and 3—3, of Figure 1.

Similar reference numerals designate corresponding parts in all the figures of the drawings.

The carburetor disclosed comprises a suitable shell 4 having an internal chamber 5 closed by a removable cap 6. The shell has an air inlet 7 on one side that communicates, as shown at 8, with the lower portion of the chamber wall. An outlet 9, opening through the opposite side of the shell, has communication at 10 with the upper portion of the chamber 5. The outlet is controlled by a suitable butterfly valve 11. The shell is furthermore provided below the chamber 5 with a depending extension 12 having a bore 13 in which is placed a spray nozzle 14 which has its upper end provided with a flange 15 that rests upon the bottom 16 of the chamber 5. This nozzle has its discharge orifice 17 delivering centrally and upwardly into the chamber 5. The said orifice is controlled by a needle valve 18, the stem 19 of which is threaded through the cover 6. Surrounding the extension 12 is a supply reservoir 20 that has communication with the lower portion of the nozzle 14 through a port 21. The chamber 5 is provided between the inlet port 8 and the outlet port 10 with an annular shoulder 22.

A choke element is employed in the device illustrated in the drawings and as shown comprises a tubular portion or sleeve 23 of less diameter than the chamber 5 and tapering downwardly. This sleeve, as shown, has its lower end resting upon the bottom 16 of the casing 5, while its top is provided with an outstanding flange 24 that rests upon the shoulder or seat 22. The bore of the tubular portion may be downwardly tapered, but has its lower portion expanded outwardly, as shown at 25. This tubular portion is provided with a plurality of tangentially arranged openings 26. These openings may be inclined inwardly and upwardly. The openings described afford communication between the air inlet 8 and the lower portion of the bore of the sleeve and cause a whirling action of the air entering the tubular portion 23. Another set of openings or ports 27 is formed in the upper portion of the sleeve just below the flange 24, the openings being tangentially disposed and inwardly and upwardly inclined. In the illustrated embodiment of my invention the ports of the upper set are less in number than the lower, and have a combined area which is less than said lower ports.

The choke element 23 is made of material having considerable thickness in order that the openings 26 and 27 may have sufficient length to guide and give a definite direction to the air streams as they enter; this direction being tangential will cause a whirling action of the air drawn within the tubular member 23. The rotary motion set up within the tubular member causes the particles of liquid which are not vaporized at the needle valve to be broken up. This results in complete and thorough atomization so that all of the fuel leaves the carburetor in condition to be fired in the engine cylinders.

The tubular member 23 being stationary, and being spaced on all sides from the walls of chamber 5 allows air to enter through the openings 26 and 27 which have an area sufficient to take care of any demand.

With this construction it will be evident that the air is drawn into the tubular member 23 in a tangential direction along its length and will be caused to whirl within the same. Experience has demonstrated that this action results in a more complete and thorough atomization of the liquid fuel projected from the spray nozzle, thereby insuring a better explosive mixture with a smaller amount of initial fuel. The device obviously can be either made as an initial element in the construction of the carburetors or where other choke devices are employed, they may be removed and the present device used in lieu thereof.

From the foregoing it is thought that the construction, operation and the many advantages of the herein described invention will be apparent to those skilled in the art, without further description, although it will be understood that various changes in the size, shape, proportion and minor details of construction may be resorted to within the scope of the claims without departing from the spirit or sacrificing any of the advantages of the invention.

Having thus described my invention, I claim:

1. The combination with a carburetor of a choke element, comprising a tubular body of considerable thickness having a tapered bore and an outstanding flange at the end having the larger diameter of the bore, the end portions of the walls of said body having sets of tangentially disposed air inlets opening into the bore and inclined inwardly toward the end having the flange, the set at the flanged end having less aggregate capacity than the set at the opposite end and means to deliver fuel to the bore of the choke element.

2. In a carburetor, the combination with a shell having an air passageway therethrough including an internal chamber having a bottom, of means for supplying fuel to the chamber at the bottom thereof and a choke element comprising a sleeve of considerable thickness located in the chamber and resting on the bottom thereof around the fuel supply means, said sleeve having a set of tangential air inlet ports in its walls adjacent to the fuel supply means and another set of tangential ports at its other end.

3. In a carburetor, the combination with a shell having an internal chamber provided with a bottom and with an air inlet opening into the lower portion of one side of the chamber and an outlet communicating with the upper portion of the opposite side of the chamber, said chamber having an annular seat between the inlets and outlets, of a choke sleeve of considerable thickness in the chamber having a flange at one end that rests upon the seat, the other end resting against the bottom of the chamber, said sleeve having a bore which is of greater diameter at the flanged end than at the opposite end, said sleeve having a set of tangentially disposed ports at each end, said ports being inclined inwardly toward the flanged end, and means for introducing fuel into the sleeve at the bottom thereof.

In testimony whereof, I hereunto affix my signature.

ROY MORTIMER TANGYE.